US005926639A

United States Patent [19]
Richardson

[11] Patent Number: 5,926,639
[45] Date of Patent: Jul. 20, 1999

[54] EMBEDDED FLOW INFORMATION FOR BINARY MANIPULATION

[75] Inventor: Stephen E. Richardson, Los Altos, Calif.

[73] Assignee: Sun Microsystems, Inc., Mountain View, Calif.

[21] Appl. No.: 08/775,717

[22] Filed: Dec. 18, 1996

Related U.S. Application Data

[63] Continuation of application No. 08/311,132, Sep. 22, 1994, abandoned.

[51] Int. Cl.$^6$ ........................................................ G06F 9/45
[52] U.S. Cl. ............................ 395/705; 395/707; 395/709
[58] Field of Search .................................. 395/705, 707, 395/708, 709

[56] References Cited

U.S. PATENT DOCUMENTS

| | | |
|---|---|---|
| 4,099,230 | 7/1978 | Mead . |
| 4,831,525 | 5/1989 | Saito et al. . |
| 5,193,190 | 3/1993 | Janczyn et al. . |
| 5,404,530 | 4/1995 | Koyanagi et al. . |
| 5,428,786 | 6/1995 | Sites . |
| 5,446,900 | 8/1995 | Kimelman . |
| 5,448,737 | 9/1995 | Burke et al. ............................ 395/709 |
| 5,448,740 | 9/1995 | Kiri et al. . |
| 5,450,575 | 9/1995 | Sites . |
| 5,469,572 | 11/1995 | Taylor . |
| 5,485,616 | 1/1996 | Burke et al. . |
| 5,493,675 | 2/1996 | Faiman, Jr. et al. . |
| 5,598,560 | 1/1997 | Benson ................................... 395/707 |
| 5,649,203 | 7/1997 | Sites ....................................... 395/709 |
| 5,652,889 | 7/1997 | Sites ....................................... 395/708 |

FOREIGN PATENT DOCUMENTS

| | | |
|---|---|---|
| WO 90/01738 | 2/1990 | WIPO . |
| WO 92/15939 | 9/1992 | WIPO . |

OTHER PUBLICATIONS

"The XDos Binary Code Conversion System" John Banning, COMPCON Spring '89—34th IEEE Computer Society International Conference—Intellectual Leverage, Feb. 1989, pp. 282–287.

Kramer et al., "The Combining DAG: A Technique for Parallel Data Flow Analysis," Proceedings of the 6th International Parallel Processing Symposium, IEEE CS Press, Mar. 23–26, 1992, pp. 652–655.

Gupta et al., "A Framework for Partial Data Flow Analysis," Proceedings of the International Conference on Software Maintenance, IEEE CS Press, Sep. 19–23, 1994, pp. 4–13.

Richardson et al., "Code Optimization Across Procedures," IEEE Computers, Feb. 1989, pp. 42–50.

Richardson, S. E., "Exploiting Trivial and Redundant Computation," Proceedings of the 11th Symposium on Computer Arithmetic, IEEE CS Press, Jun. 29–Jul. 2, 1993, pp. 220–227.

*Primary Examiner*—James P. Trammell
*Assistant Examiner*—Peter J. Corcoran, III
*Attorney, Agent, or Firm*—Blakely Sokoloff Taylor & Zafman

[57] ABSTRACT

A method and apparatus for making flow information available for binary manipulation tasks are disclosed. Flow information is generated and saved either by a compiler or by a flow information generator. A compiler generates the flow information directly from a source file while the compiler is compiling the source file into an executable file. A flow information generator generates the flow information from an executable file in a manner similar to a compiler. Further, the flow information generator groups the executable file into units of text and traces the units to produce the flow information. The binary information thus retrieved is saved and embedded either in a text or a header of the executable file or placed in a file separate from the executable file. The flow information may be used in binary manipulations including binary translations, binary-to-binary optimizations, program tracing, and program debugging.

13 Claims, 11 Drawing Sheets

| PROGRAM | FLOW INFORMATION |
|---|---|
| T1: COMPARE REG$_1$ TO REG$_2$<br>BRANCH-IF-NOT-EQUAL TO T3 | T1: TEXT LOCATION 0X2110<br>PRED T0 / SUCC T2 T3<br>LIVEIN REG$_1$ REG$_2$ / LIVEOUT NONE |
| T2: SET REG$_3$ TO 1 | T2: TEXT LOCATION 0X02118<br>PRED T1 / SUCC T3<br>LIVEIN NONE / LIVEOUT REG$_3$ |
| T3: CONTINUE | T3: TEXT LOCATION 0X0211C<br>PRED T1 T2 / SUCC T4<br>LIVEIN REG$_3$ / LIVEOUT REG$_3$ |

Fig. 11a

| PROGRAM | FLOW INFORMATION |
|---|---|
| T1: SET REG$_4$ TO 1<br>COMPARE REG$_1$ TO REG$_2$<br>MOVE-IF-EQUAL REG$_4$ TO REG$_3$ | T1: TEXT LOCATION 0X02110<br>PRED T0 / SUCC T3<br>LIVEIN REG$_1$ REG$_2$ / LIVEOUT REG$_3$ |
| T3: CONTINUE | T3: TEXT LOCATION 0X0211C<br>PRED T1 / SUCC T4<br>LIVEIN REG$_3$ / LIVEOUT REG$_3$ |

Fig. 11b

EMBEDDED FLOW INFORMATION FOR BINARY MANIPULATION

This is a Continuation Application of application Ser. No. 08/311,132, filed Sep. 22, 1994 now abandoned.

BACKGROUND OF THE INVENTION

1. Field of the Invention

The invention relates to the field of program flow information. More particularly, the invention relates to a method and apparatus for using embedded program flow information for binary manipulation.

2. Art Background

Tasks involving binary manipulations include binary translation which is the process of converting binary code targeted for one machine to another machine, and binary optimization which is the process of converting a less efficient binary code to a more efficient binary code. Such tasks are difficult due to the need to generate flow information for the executable file upon which the particular binary manipulation is being performed.

Flow information is information describing the flow of program execution sequences. Flow information includes but is not limited to: control flow information, (such as basic block, superblock, tree, and/or hyperblock successors and predecessors), data flow information (such as register liveness or information concerning assignment of variables to registers), data type information, and information about array access patterns, alias information indicating which memory access might be altered as a side effect of some instruction or instruction sequence, identification of idiomatic control structures such as jump tables, and identification of idiomatic data flow information such as stride lengths for array accesses.

Typically, flow information is derived each time the need arises during a binary manipulation. The drawback in having to derive flow information as the need arises is the amount of time consumed in building such information during a binary manipulation.

Problems may be encountered during a binary manipulation if certain necessary flow information is not available. For example, a problem arises during a binary translation if a program being translated has jump tables. To perform an accurate binary translation of a program, the entire flow of the region of interest must be known. A jump instruction in a program being translated may indicate a jump to one of a given number of different locations depending upon a value stored at a register X. If the value of the register X is not known, the binary translation being performed will not produce accurate results.

If a program can be divided into semi-independent sub-units such as modules or procedures, it suffices to know the entire flow of only the sub-unit being manipulated.

The efficiency of a binary-to-binary optimization depends on the level of the detail of the flow information. Thus to turn poor code into good code or good code into better code, more accurate flow information is desirable.

Finally, in program debugging, bug fixing, and tracing activities, certain embedded flow information is desirable to perform such tasks in a more efficient manner. A program being debugged must be traced step by step. For example, in a program being debugged, if a register Y is assigned a value, and the flow information indicates that the value assigned to register Y never gets used in the rest of the program, this detects a potential bug in the program.

With the advent of increased interest in certain tasks involving binary manipulations and given that the generation of flow information is time consuming, there is a need for a method and apparatus to make necessary flow information available during tasks involving binary manipulations.

BRIEF SUMMARY OF THE INVENTION

A method and apparatus for making flow information available for tasks involving binary manipulation are disclosed. In the present invention, flow information is generated and saved by either the compiler or by an embedded flow information generator (EFI generator). In the first method, the compiler generates the flow information directly from a source file. In the latter method, the EFI generator generates the flow information from an executable file in a manner similar to a compiler. The flow information thus retrieved may be embedded in the text of the code of the executable file, embedded in the symbol table of the header of the executable file or placed in an entirely separate file.

The flow information may be used for tasks involving certain binary manipulations including such tasks as binary translations and binary-to-binary optimizations. A binary translation converts the format of a program which runs on one machine so that it may run on another machine. A binary-to-binary optimization involves making an executable program faster, adding new instructions, and/or making the binary program shorter to save memory space. These and other tasks involving binary manipulations require certain flow information for such tasks to run in an efficient manner.

In sum, the availability of pre-generated flow information for an executable program provides fantastic efficiency in the performance of tasks involving binary manipulations on such an executable program. Further, tasks involving binary manipulations become faster and more efficient as compared to the past methods involving the generation of flow information on a need basis during binary manipulations.

BRIEF DESCRIPTION OF THE DRAWINGS

FIG. 11a illustrates an exemplary binary code.

FIG. 11b illustrates the same binary code after a binary-to-binary optimization.

DETAILED DESCRIPTION OF THE INVENTION

Apparatus and method for providing embedded flow information for use in binary manipulations is disclosed. For purposes of explanation, specific exemplary modules, instructions, etc., are set forth to provide a thorough understanding of the present invention. However, the invention may be practiced without the specific details described herein.

Flow information for an executable file might be generated multiple times by a compiler from a source code during a compilation process. Once the compilation process is completed, some of the flow information that is discarded during compilation can never be accurately retrieved again.

Figure 1:
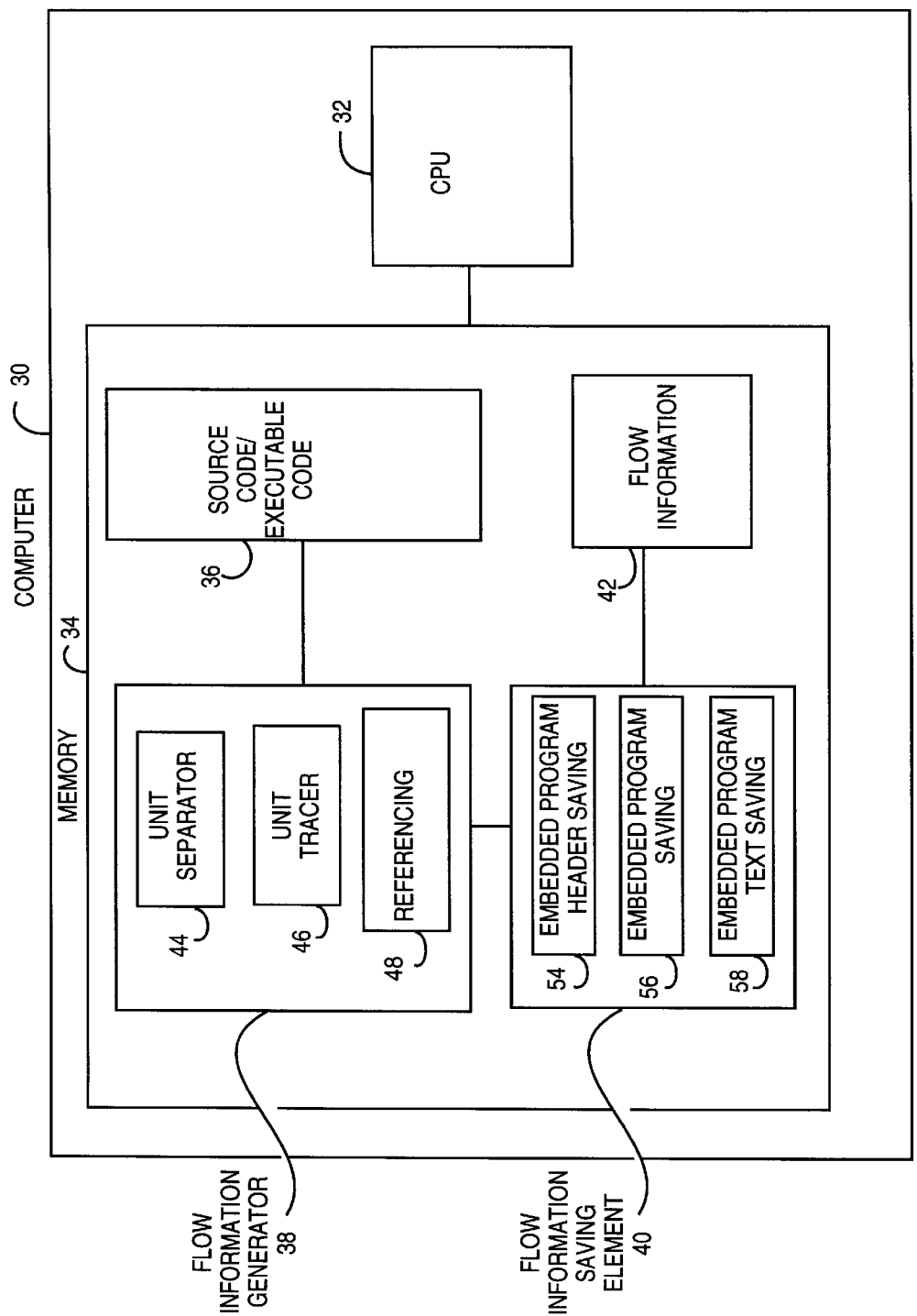
FIG. 1 is a block diagram illustrating a flow information generator of the present invention.

FIG. 1 is a block diagram illustrating a flow information generator of the present invention. CPU 32 of computer 30 drives flow information generator 38 of memory 34. Flow information generator 38 generates program flow information for source code or executable code 36 and flow information saving element 40 saves flow information 42 generated by flow information generator 38. Flow information generator 38 may either be source program based or executable program based. A source program based flow information generator generates program flow information directly from a source code of an executable program while an executable program based flow information generator generates program flow information from executable code and hence after program compilation. Program flow information generated directly from the source code is generated more quickly and is more accurate than program flow information generated from an executable code.

Flow information generator 38 includes unit separator element 44, unit tracer element 46 and referencing element 48. Unit separator element 44 separates code 36 into units such as basic blocks and unit tracer element 46 traces the units to generate flow information 42. Units of an executable program are referenced to corresponding flow information by referencing element 48. Once flow information generator 38 generates flow information for code 36, flow information saving element 40 saves the flow information generated from code 36 as flow information 42. The flow information may be saved by being embedded into a program header by embedded program header saving element 54, saved as an embedded file by embedded file saving element 56 or saved as embedded in a program text by embedded program text saving element 58.

Figure 2:
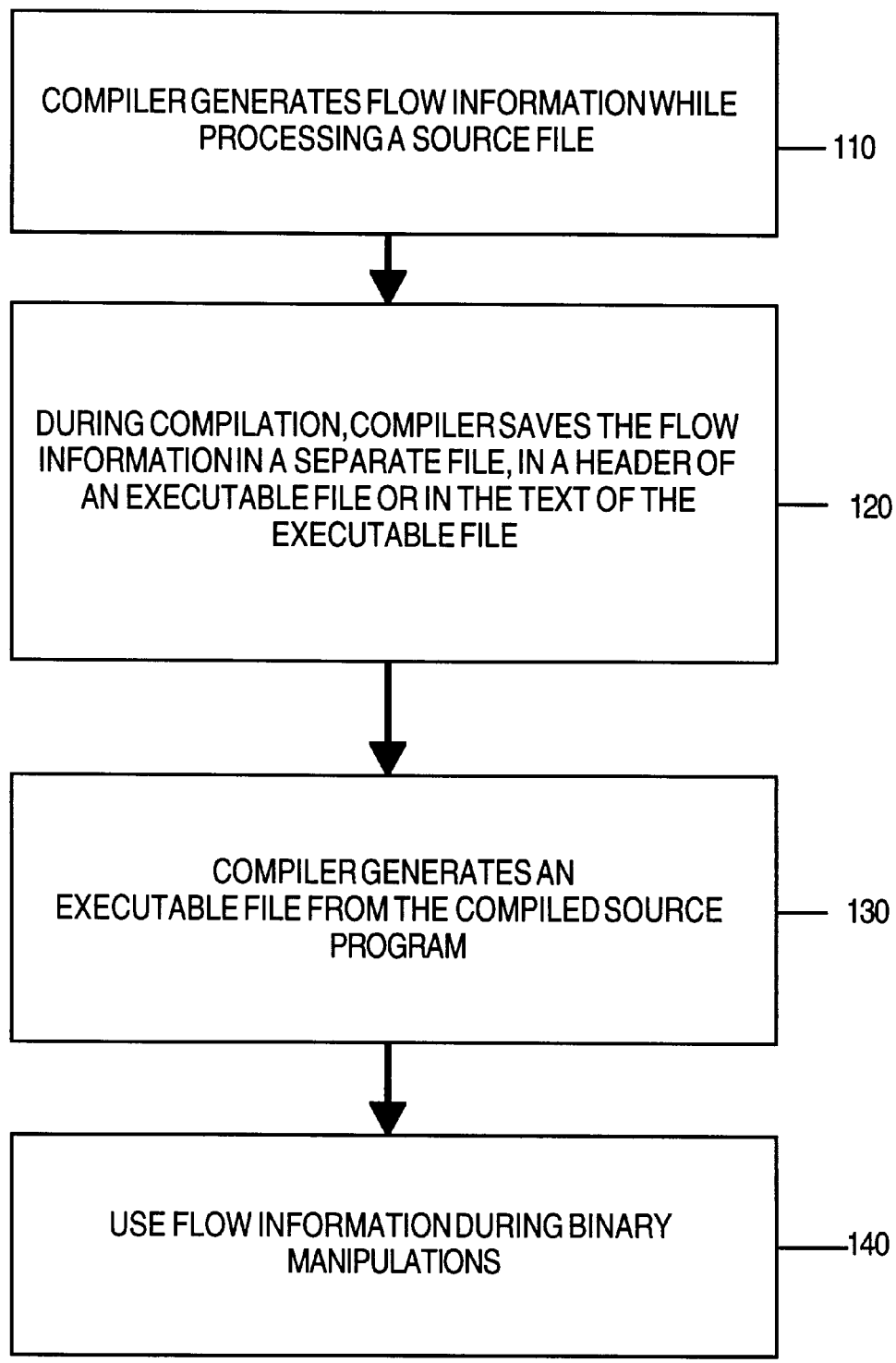
FIG. 2 is a flow chart illustrating an embedded flow information file generation by a compiler.

FIG. 2 illustrates the present invention's method of saving the flow information generated by the compiler for use after the compilation process. In step 110, flow information is generated during compilation of a source file. In step 120, as the flow information is generated, the compiler saves the flow information in a file separate from the executable file, or either in the header or in the text of the executable file. In step 130, the compiler generates the executable file. Finally, in step 140, the flow information generated and saved during compilation may be used during binary manipulations after the compilation process.

Figure 3:
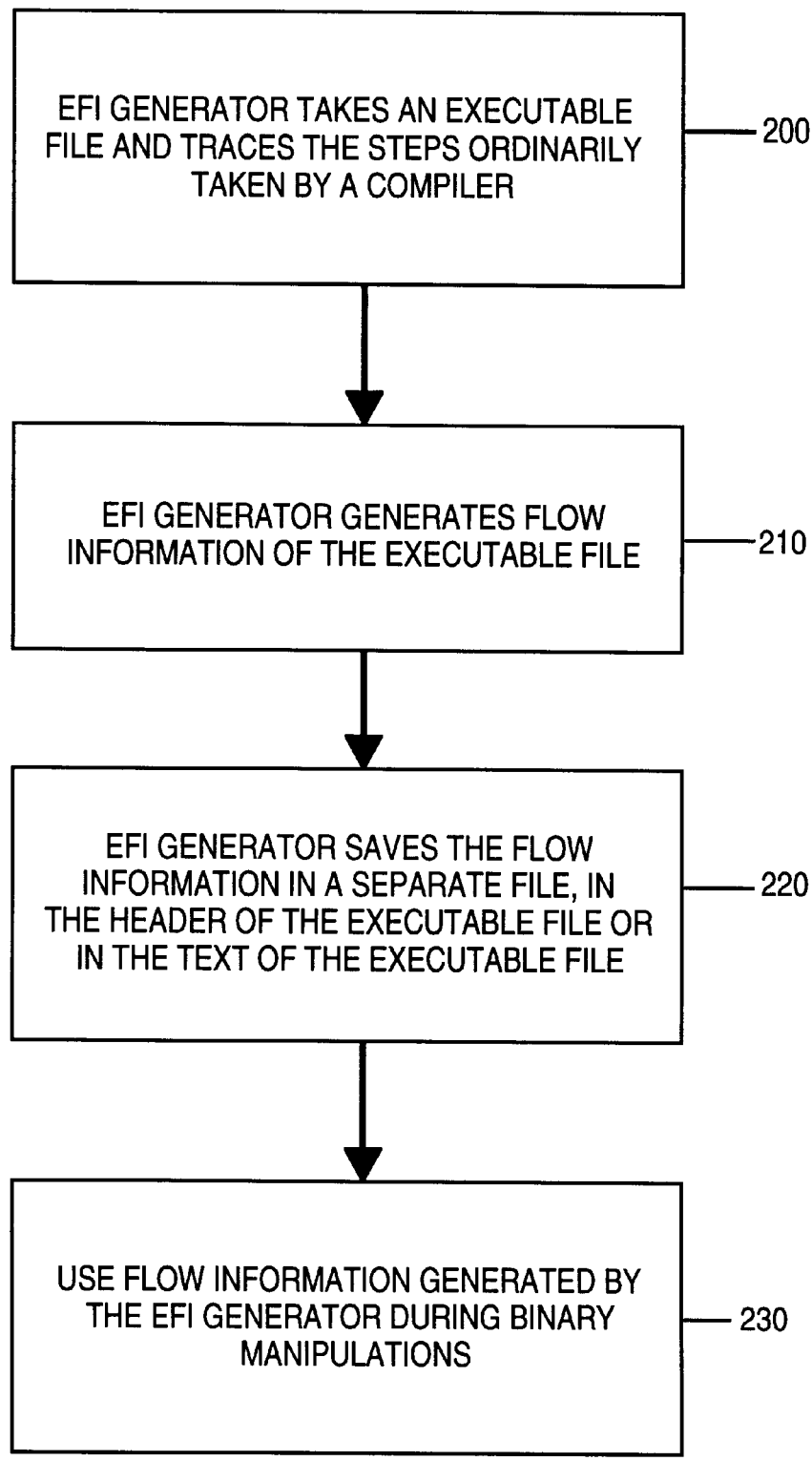
FIG. 3 is a flow chart illustrating an embedded flow information file generation by an embedded flow information generator.

FIG. 3 illustrates an alternative method of generating and saving flow information. In steps 200 and 210, an embedded flow information (EFI) generator generates flow information from an executable file in a manner similar to a compiler generating flow information from a source file. The EFI generator examines an executable file and divides the executable file into units such as basic blocks, builds an array of the units and steps through those units to generate the flow information. This method derives the flow information from an executable file whereas in the above described compilation method, the compiler generates the flow information directly from a source file. In step 220, the EFI generator saves the flow information in a file separate from the executable file, or in either the header or the text of the executable file. Finally, in step 230, the saved flow information may be used in a binary manipulation.

Figure 4:
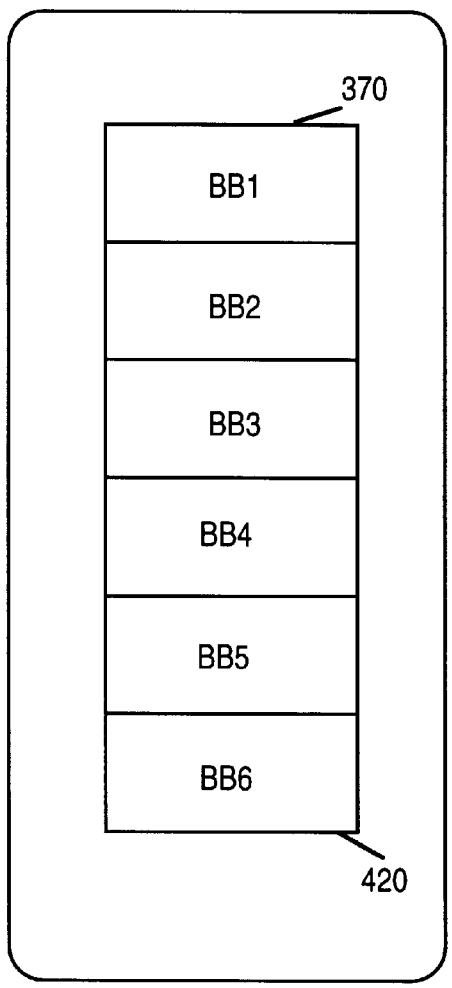
FIG. 4 illustrates an exemplary flow information file keyed to basic blocks in a binary code.
Figure 4:
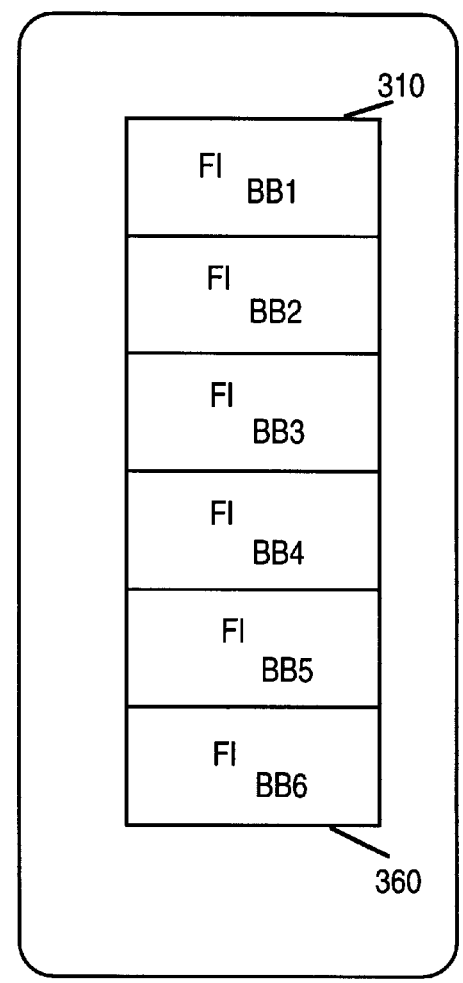

Several methods exist for implementing EFI. Three such methods will be described in the following description. FIG. 4 illustrates a method of implementing EFI in a separate file foo.fi 300 with each of its flow information blocks 310 to 360 keyed to corresponding basic blocks (BB) 370 to 420 of an executable file, foo.exe 430. Alternatively, flow information may be keyed to any number of different ways for representing parts of an executable file such as to superblocks, hyperblocks, trees, arcs between basic blocks, arcs between superblocks, arcs between hyperblocks, arcs between trees and individual statements.

Figure 5:
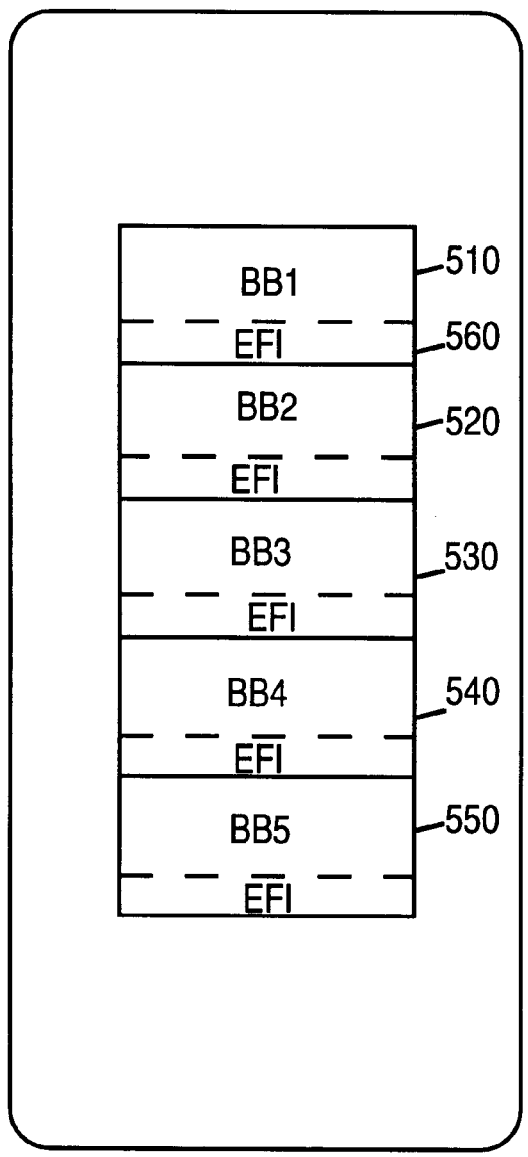
FIG. 5 illustrates an exemplary binary code with embedded flow information.

FIG. 5 illustrates the method of implementing EFI as embedded in the code of the executable file. An executable file foo.exe 500 is separated into five basic blocks BB1 through BB5 510 to 550. Each basic block in the executable file foo.exe 500 contains flow information EFI 560, either as non-executable code or as data to be branched around. As an alternative, EFI 560 may be keyed to superblocks, arcs between basic blocks, arcs between hyperblocks, individual statements, etc., instead of keyed to the basic blocks as illustrated in FIG. 4.

Figure 6A:
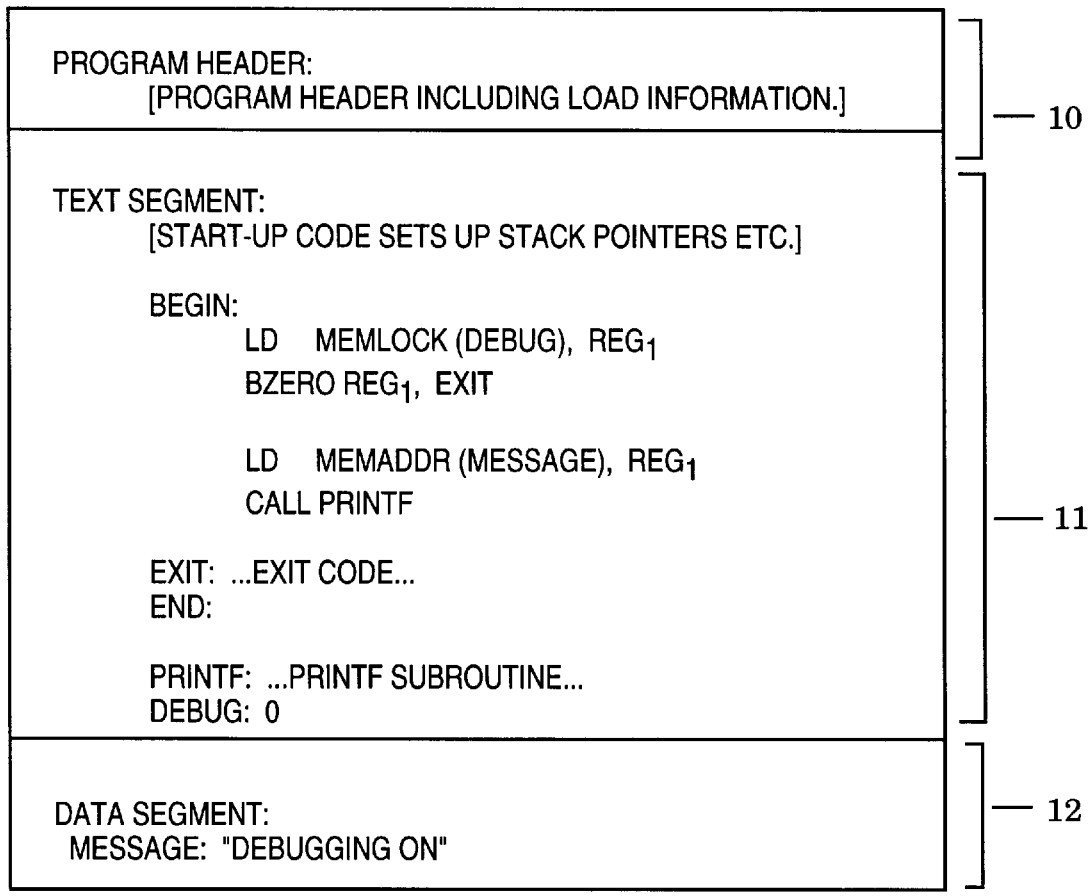
FIG. 6a illustrates an exemplary binary code.
Figure 6B:
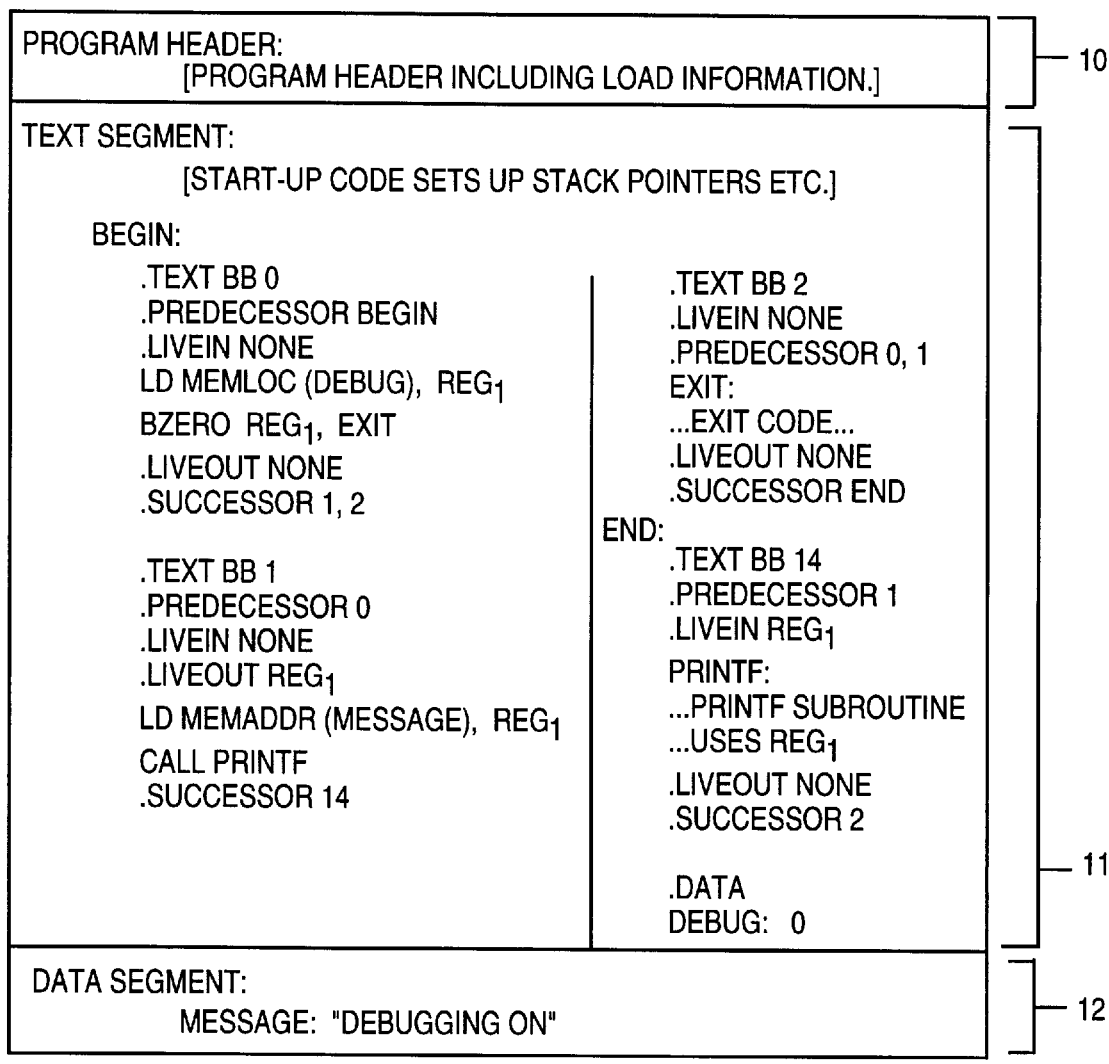
FIG. 6b illustrates the same exemplary binary code with EFI.

FIG. 6a illustrates an exemplary binary code. FIG. 6b illustrates the same exemplary binary code with EFI. The exemplary binary code in FIG. 6a consists of program header 10 containing load information (i.e. information on how to load the program in memory), and text segment 11 containing executable code (in which data may or may not be embedded) and data segment 12. In the binary code of FIG. 6a, the contents of a variable debug are placed into register 1 ($reg_1$) and a branch conditionally causes a jump to a program exit routine if the content of register 1 is equal to zero. Otherwise, register 1 is loaded with a pointer to the message "debugging on". Finally, the program calls a subroutine (printf) to print the message.

The same binary code of FIG. 6a with EFI may be, for example, in the form of the binary code illustrated in FIG. 6b. Each basic block is preceded by an identifying marker text bb (bb standing for basic block) and a basic block number, a list of predecessor blocks and a list of registers live on entry to the block. Appended at the end of each basic block is information concerning registers containing live data at block exit, and a list of successor blocks. Second basic block bb1, for example, is preceded by basic block bb0 and followed by basic block bb14. Further, information is not passed to basic block bb1, (.live-in none), but bb 1 passes information to its successor through register 1 (.liveout $reg_1$).

Alternatives to the basic scheme introduced by the binary code of FIG. 6b with EFI may include implicitly numbering the basic blocks according to the basic blocks' order in the program and discarding the ".text bb number" identifier at the beginning of each basic block. In the alternative, the basic blocks may be implicitly numbered according to the basic blocks' location in memory. In addition, the binary code may be grouped into units of superblocks, hyperblocks, decision trees, etc., instead of grouping the binary code into units of basic blocks. Information regarding whether a register is assigned a value may be extended to include information on variables in memory as well. Finally, instead of attaching the EFI to each node (control flow graph), the very same embedded flow information may be attached to the arcs between the nodes (control dependence graph). Further, relocation information is generally present in the object files during link time and currently discarded after the linker has done its job. This information may be retained in the final binary file as an example of other types of information that may be contained in the embedded flow information.

Other optimizations and extensions to the type of information that may be included as EFI includes basic data flow information for scalar variables and registers, basic data flow information for expressions and constants, interprocedural information for registers and scalar variables, alias information for scalar variables, and data dependence information. Further, basic information, interprocedural information, and alias information for arrays may also be included as EFI. In addition, alias information indicating which memory access might be altered as a side effect of some instruction or instruction sequence, and/or identification of idiomatic control structures such as jump tables, identification of idiomatic data flow information such as stride lengths for array accesses may be included as EFI.

Figure 7:
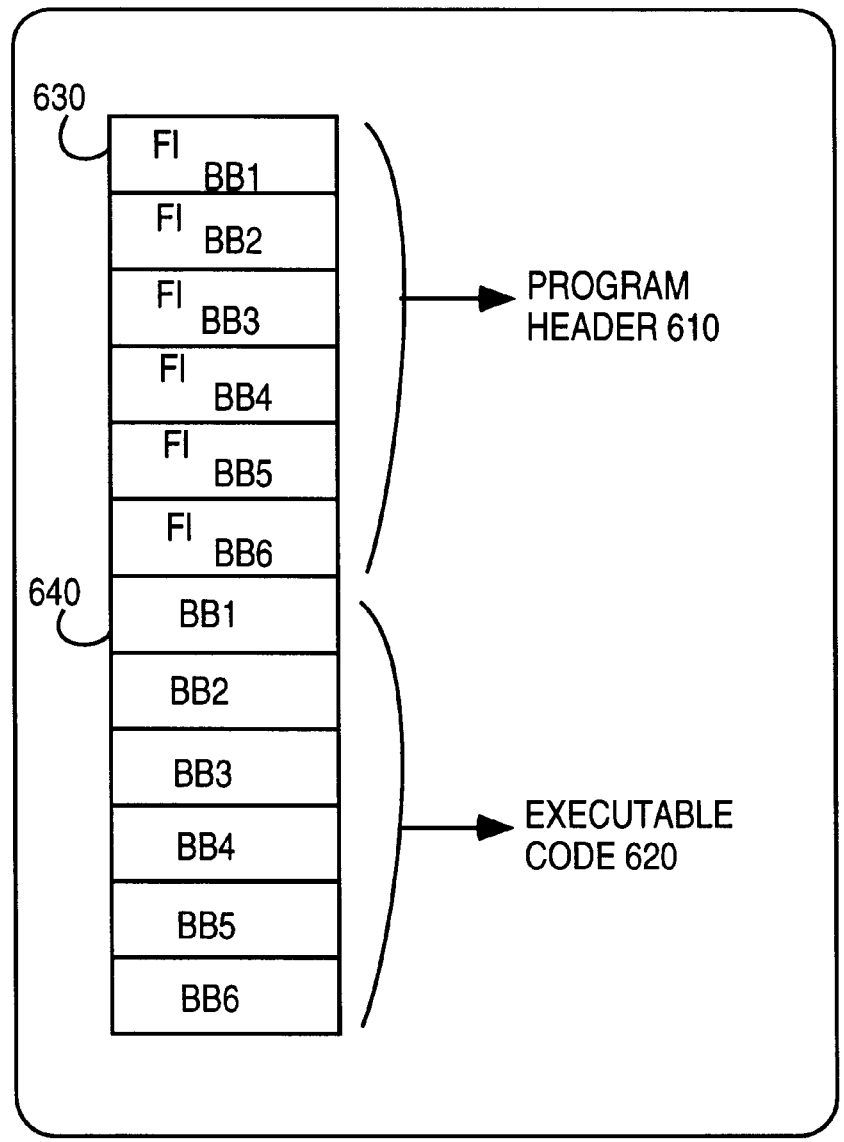
FIG. 7 illustrates an exemplary program header augmented to include flow information.

FIG. 7 illustrates another method for implementing EFI. Binary code foo.exe 600 contains program header 610 and executable code 620. For each basic block BBnumber in executable code 620, program header 610 retains appropriate flow information $FI_{BBnumber}$. As an alternative, flow information $FI_{BBnumber}$ may be keyed to blocks of executable code 620 which may be in units of superblocks, arcs between basic blocks, arcs between hyperblocks, individual statements, etc.

Figure 8:
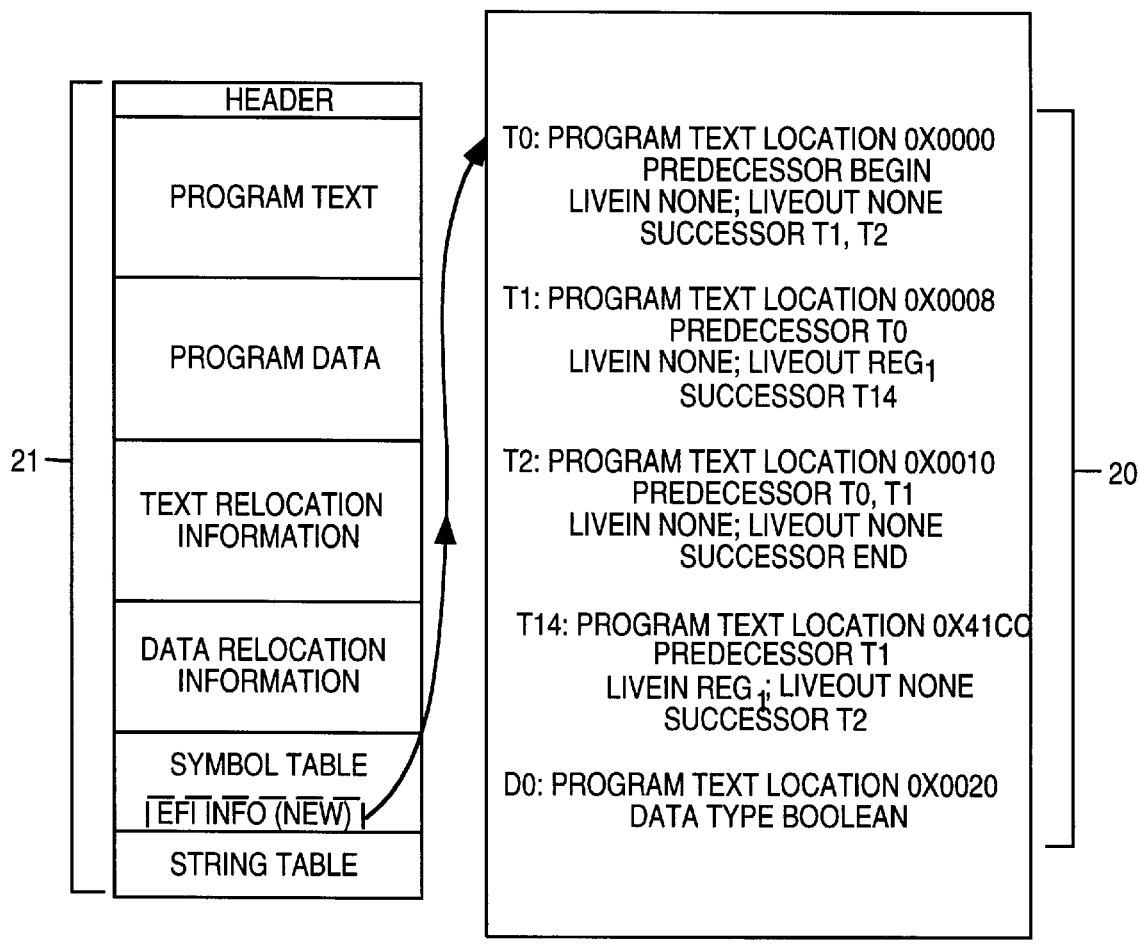
FIG. 8 illustrates an exemplary program header augmented to include flow information.

FIG. 8 illustrates an exemplary embodiment of a standard UNIX® a.out format augmented to include embedded flow information. This exemplary embodiment includes flow information 20 in the existing symbol table segment of header 21. EFI in the symbol table contains text segment information t0, t1, t2, t14 and data segment information D0. Each text segment information contains the EFI for each basic block of the program text. For example, t1 is the EFI for the basic block 1 of the program text and gives the program text location information and the information regarding the predecessor basic block which in this case is basic block 0 as indicated by "predecessor t0". In addition, the EFI in t1 includes information on whether or not there is live data coming into the basic block 1 which in this case is none as indicated by "livein none", and whether there is any live information going out of basic block 1. In this case register 1 contains data as indicated by "liveout $reg_1$". Finally, the EFI in t1 includes information on the successor block which in this case is basic block 14 as indicated by "successor t14".

Figure 9:
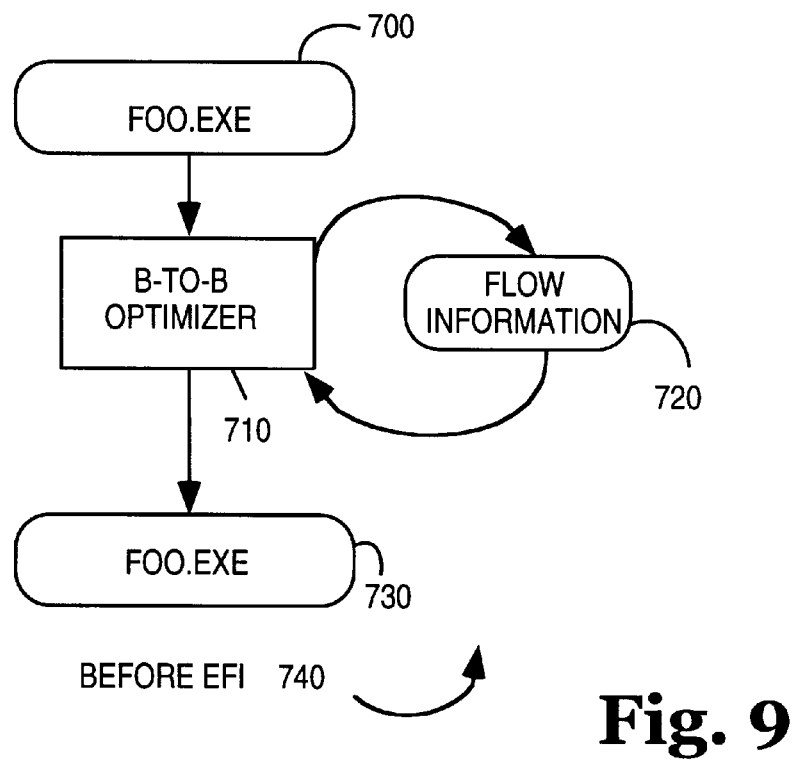
FIG. 9 illustrates a binary-to-binary optimization performed without the embedded flow information of the present invention.

FIG. 9 illustrates the use of EFI for binary-to-binary optimization. In a binary-to-binary optimization, an executable program is modified such that it runs faster, or utilizes new instructions or utilizes less memory space. Without the availability of a pre-generated EFI of the invention, a binary-to-binary optimizer 710 generates its own flow information 720 from executable program foo.exe 700 to produce a better executable program foo.exe 730. The flow information is generated by the optimizer during the optimization process requiring extra time and memory for the optimization to take place.

Figure 10:
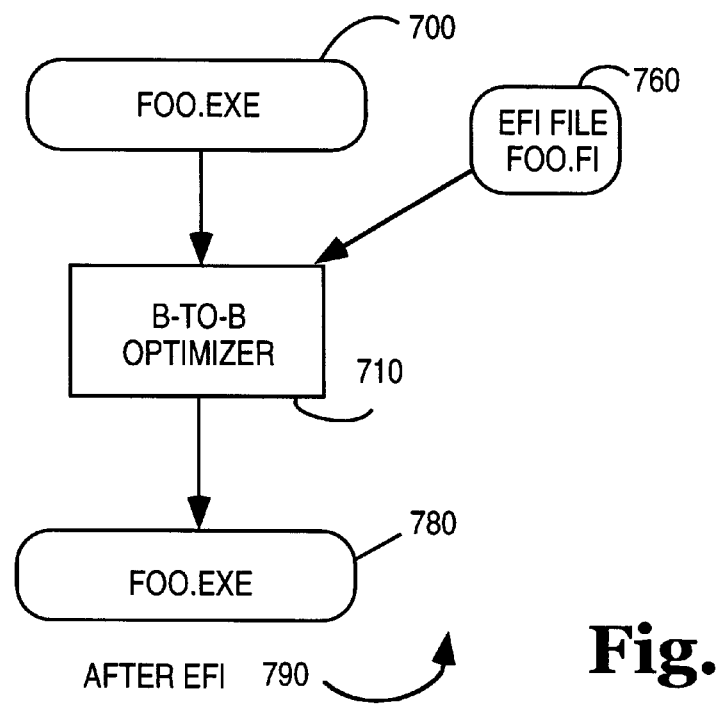
FIG. 10 illustrates a binary-to-binary optimization using pre-generated embedded flow information of the present invention.

In FIG. 10 in contrast, the EFI of the executable program foo.exe 700 is provided in EFI file foo.fi 760. The binary-to-binary optimizer uses the EFI in file foo.fi 760 to optimize executable program foo.exe 700 to generate an optimized executable program foo.exe 780.

A simple example of how pre-generated EFI is used during binary-to-binary optimization is illustrated by examining the EFI in FIG. 11a. In a case in which an instruction set architecture was being optimized to contain a move-conditional instruction, abbreviated as movcc, a movcc instruction "move-if-cc $reg_a$ to $reg_b$," conditionally copies information from a register a to a register b depending upon some condition cc contained within a condition code register. As an example, "move-if-equals $reg_1$ to $reg_2$," copies the contents of register 1 to register 2 if and only if the condition contained within the condition code register indicates an equal. FIGS. 11a and 11b correspond to an algorithm for setting a register 3 equal to one if the content of register 1 equals that of register 2.

In FIG. 11a, three basic blocks exist. In basic block t1 register 1 is compared with register 2 and if the contents of register 1 and register 2 are not equal, the program branches to basic block t3 and the program continues. Otherwise if register 1 and register 2 contain equal values, there is no branching to t3; instead basic block t2 is entered and register 3 is set to equal the constant one. By optimizing an executable program by adding a move-conditional instruction as described previously, FIG. 11a is transformed into a more simple code sequence as illustrated in FIG. 11b.

In FIG. 11b, there are only two basic blocks, namely basic block t1 and basic block t3. In basic block t1, register 1 is set to a constant value of one and register 1 and register 2 are compared. If register 1 and register 2 are not equal, the contents of register 4 is copied to register 3. Otherwise, basic block t3 is entered and the program continues. For the transformation from the code in FIG. 11a to the optimized code in FIG. 11b to occur, register 4 must be available and not assigned any value on exit from basic block t1 (i.e. $reg_4 \notin$ liveout(t1)). In addition, basic block t2 must not have any predecessors other than basic block t1 which may interfere with the optimization (i.e. pred(t2)=={t1}). The two required pieces of information are easily retrieved out from the pre-generated EFI of the program. Although such information may be derived in the absence of EFI, such generation of information would require processing a large amount of code. Pre-generated EFI allows optimization without the need for processing the entire code. Instead, sections of pre-generated flow information may be examined as a much simpler "peephole" to process, without regard to the surrounding code.

Other uses for EFI include use of EFI in binary translations. In a binary translation, a binary code targeted for one type of machine is converted by a binary translator into a binary code targeted to a different type of machine. For example, a binary translator may convert a PC program into a program that runs on a work station. Without the EFI of the present invention, a binary translator must generate its own flow information, requiring extra time and memory. Given the use of the pre-generated flow information of the present invention, the binary translator does not have to generate any flow information as it translates the executable code. In addition, the binary translator will only have to examine pertinent portions of the EFI used by the binary translator and may ignore the rest of the EFI. Hence, a binary translator is able to process the translation faster.

Another example of the use of EFI of the present invention is in program tracing, debugging and bug fixing. Program tracing is a process of running an annotated binary code in order to derive a program execution profile. Debugging is the process of identifying incorrect code within a binary file. Bug fixing is the process of substituting correct code for incorrect code. With the use and availability of EFI, a debugger may produce a greatly improved level of information regarding a particular program the debugger is tracing or debugging. Information which may be used during program tracing, debugging or bug fixing includes where and if a certain variable is used in a program. For example, if in a program, a given register X is assigned a value and if the value in register X is never used in the rest of the code, the fact that the value is never used may be an indication that there is an error in the program being debugged. In sum, EFI greatly improves the efficiency as well as the type of information a debugger produces regarding a program it is debugging.

There are many advantages to embedding flow information in the executable code itself rather than leaving it in a separate file. One of the advantages is that the executable code cannot easily be separated from the EFI. Another advantage is that the EFI does not overload the file system with extra files that have to be maintained. Yet another advantage is that the EFI can be positioned near the code to which it refers for easier manipulation.

What has been described is a method and apparatus for including flow information in the final, released form of computer software. Such flow information may be embedded in-line with binary code, included in the program header or any other similar existing structure within the program itself, or included as a separate file associated with, but separate from, the binary code itself. The type of information which may be included in EFI includes, but is not limited to, control flow information, such as basic block, superblock, tree, and/or hyperblock successors and predecessors. In addition, data flow information, such as register liveness or liveness of local and global variables, data type information, and information about arrays and array access patterns may also be included as EFI. Further, alias information indicating which memory access may be altered as a side effect of some instruction or instruction sequence, identification of idiomatic control structures such as jump tables, and identification of idiomatic data flow information such as stride lengths for array accesses may also be included as EFI.

Finally, the pre-generated flow information is useful for many different types of binary manipulations such as binary translations, binary-to-binary optimizations, program tracing, debugging and bug fixing. The use of pre-generated flow information for binary transformation produces a more efficient, memory saving and faster method of performing various binary transformations as compared to the method of building flow information entirely from scratch each time a binary transformation/manipulation is performed.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

I claim:

1. A method comprising the steps of:

generating program flow information in the form of binary code for an executable program at one of compilation of a source program into said executable program and subsequent to a program compilation, said program flow information being approximately for the entire executable program;

saving said program flow information for use after completion of said compilation of said source program, said program flow information saved in one of said executable program and a file separate from said executable program;

referencing portions of executable code of said executable program to corresponding program flow information; and using said program flow information for binary manipulation including at least one of binary translation, binary-to-binary optimization, program tracing and program debugging.

2. The method of claim 1 further comprising the steps of:

grouping said executable program into units of text; and tracing said units of text to retrieve said program flow information.

3. The method of claim 1 further comprising the step of saving said program flow information in a program header of said executable program.

4. The method of claim 1 further comprising the step of saving said program flow information in the text of said executable program.

5. The method of claim 1 further comprising the steps of:

grouping said source program into units of text; and tracing said units of text to retrieve said program flow information.

6. An apparatus comprising:

a flow information generator configured to generate program flow information in the form of binary code for an executable program at one of compilation of a source program into said executable program and subsequent to a program compilation, said program flow information being approximately for the entire executable program;

a unit separator element configured to separate one of said executable program and said source program into units such as basic blocks;

a unit tracer element configured to trace one of said units of said executable program and said source program to generate said flow information;

a referencing element configured to reference each of said units of said executable program to corresponding flow information; and a flow information saving element configured to save said program flow information generated by said flow information generator for said executable program for use after completion of said compilation of said source program, said program flow information saved in one of said executable program and a file separate from said executable program, and used for binary manipulation including at least one of binary translation, binary-to-binary optimization, program tracing and program debugging.

7. The apparatus of claim 6 further comprising:

a CPU for driving said flow information generator; and a memory for saving said program flow information.

8. The apparatus of claim 6 wherein said flow information saving element further comprises an embedded program header saving element configured to save said flow information in a program header of said executable program.

9. The apparatus of claim 6 wherein said flow information saving element further comprises an embedded program text saving element configured to save said flow information in a program text of said executable program.

10. A method of providing a computer system comprising the steps of:
- providing a memory, the provided memory including, a flow information generator configured to generate program flow information in the form of binary code for an executable program at one of compilation of a source program into said executable program and subsequent to a program compilation, said program flow information being approximately for the entire executable program;
- a unit separator element configured to separate one of said executable program and said source program into units such as basic blocks;
- a unit tracer element configured to trace one of said units of said executable program and said source program to generate said flow information;
- a referencing element configured to reference each of said units of said executable program to corresponding flow information; and
- a flow information saving element configured to save said program flow information generated by said flow information generator, said program flow information saved in one of said executable program and a file separate from said executable program and used for binary manipulation including at least one of binary translation, binary-to-binary optimization, program tracing and program debugging; and
- providing a CPU for driving said flow information generator.

11. The method of claim 10 further comprising the step of providing an embedded program header saving element configured to save said flow information in a program header of said executable program.

12. The method of claim 10 wherein said flow information saving element further comprising the step of providing an embedded program text saving element configured to save said flow information in a program text of said executable program.

13. A system for generating flow information for use after program compilation, including code configured for storage on a computer-readable apparatus and executable by a computer, the code including a plurality of modules each configured to carry out at least one function to be executed by the computer, the system comprising:
- a flow information generator module configured to generate program flow information in the form of binary code for an executable program at one of compilation of a source program into said executable program, and subsequent to a program compilation, said program flow information being approximately for the entire executable program;
- a unit separator module configured to separate one of said executable program and said some program into units such as basic blocks;
- a unit tracer module configured to trace one of said units of said executable program and said source program to generate said flow information;
- a referencing module configured to reference each of said units of said executable program to corresponding flow information; and
- a flow information saving module configured to save said program flow information generated by said flow information generator for said executable program for use after completion of said compilation of said source program, said program flow information saved in one of said executable program and a file separate from said executable program, and used for binary manipulation including at least one of binary translation, binary-to-binary optimization, program tracing and program debugging.

* * * * *